US012140343B2

(12) United States Patent
Yu et al.

(10) Patent No.: US 12,140,343 B2
(45) Date of Patent: Nov. 12, 2024

(54) ELECTRIC HEATER

(71) Applicant: Gree Electric Appliances, Inc. of Zhuhai, Guangdong (CN)

(72) Inventors: Bo Yu, Guangdong (CN); Yuye Luo, Guangdong (CN); Penge Zhang, Guangdong (CN); Jian Zhang, Guangdong (CN); Huaican Liu, Guangdong (CN); Yan Kong, Guangdong (CN); Yesong Li, Guangdong (CN)

(73) Assignee: Gree Electric Appliances, Inc. of Zhuhai, Zhuhai (CN)

(*) Notice: Subject to any disclaimer, the term of this patent is extended or adjusted under 35 U.S.C. 154(b) by 486 days.

(21) Appl. No.: 17/439,294

(22) PCT Filed: Jun. 2, 2020

(86) PCT No.: PCT/CN2020/093936
§ 371 (c)(1),
(2) Date: Sep. 14, 2021

(87) PCT Pub. No.: WO2020/244505
PCT Pub. Date: Dec. 10, 2020

(65) Prior Publication Data

US 2022/0154975 A1 May 19, 2022

(30) Foreign Application Priority Data

Jun. 4, 2019 (CN) ......................... 201910481752.7

(51) Int. Cl.
*F24H 3/04* (2022.01)
*H05B 3/06* (2006.01)

(52) U.S. Cl.
CPC ............. *F24H 3/0411* (2013.01); *H05B 3/06* (2013.01); *H05B 2203/013* (2013.01); *H05B 2203/032* (2013.01)

(58) Field of Classification Search
CPC ........... F24H 3/0411; H05B 3/06; H05B 3/22; H05B 2203/013; H05B 2203/032;
(Continued)

(56) References Cited

U.S. PATENT DOCUMENTS

| | | | | |
|---|---|---|---|---|
| 2004/0103892 | A1 | 6/2004 | Shimonoma et al. | |
| 2021/0010716 | A1* | 1/2021 | Gao | F04D 25/08 |
| 2023/0168005 | A1* | 6/2023 | Pease | F24H 15/204 392/360 |

FOREIGN PATENT DOCUMENTS

| | | | |
|---|---|---|---|
| AU | 2007318043 | A1 | 6/2009 |
| CN | 201273694 | Y | 7/2009 |

(Continued)

OTHER PUBLICATIONS

International Search Report, with a mailing date of Jul. 17, 2020, in International application No. PCT/CN2020/093936, filed on Jun. 2, 2020.

(Continued)

*Primary Examiner* — Shawntina T Fuqua
(74) *Attorney, Agent, or Firm* — McAndrews, Held & Malloy, Ltd.

(57) ABSTRACT

Some embodiments of the present disclosure provide an electric heater, which includes: a housing provided with an air inlet and an air outlet, and the housing internally having an air duct communicated between the air inlet and the air outlet; and a heating member and a convection member both being assembled in the air duct, wherein the heating member being configured for heating the air entering from the air inlet to the air duct during energization, the convection member being configured for blowing a heated air from the (Continued)

air duct to the air outlet for discharging. Herein the air outlet is provided on a bottom end of the housing close to a ground.

10 Claims, 5 Drawing Sheets

(58) Field of Classification Search
CPC .... F24D 13/02; F24D 19/064; F24D 2200/08; F24D 2220/2036
See application file for complete search history.

(56) References Cited

FOREIGN PATENT DOCUMENTS

| | | | | |
|---|---|---|---|---|
| CN | 202709266 | U | | 1/2013 |
| CN | 202852946 | U | | 4/2013 |
| CN | 204853974 | U | | 12/2015 |
| CN | 105627411 | A | | 6/2016 |
| CN | 106091082 | A | * | 11/2016 |
| CN | 107642815 | A | * | 1/2018 |
| CN | 109373424 | A | | 2/2019 |
| CN | 110094797 | A | | 8/2019 |
| CN | 210035672 | U | | 2/2020 |
| GB | 2251935 | A | | 7/1992 |
| JP | H08271047 | A | | 10/1996 |

OTHER PUBLICATIONS

Chinese search report dated Nov. 24, 2023 in Chinese application No. 2019104817527 (2 pages).

* cited by examiner

ELECTRIC HEATER

CROSS-REFERENCE TO RELATED APPLICATION

The present disclosure is a national stage disclosure of International Patent Disclosure No. PCT/CN2020/093936, which was filed on Jun. 2, 2020, and claims priority to Chinese Patent Disclosure No. 201910481752.7, filed on Jun. 4, 2019 and entitled "Electric heater", the contents of which are hereby incorporated by reference in its entirety.

TECHNICAL FIELD

The present disclosure relates to a technical field of heating devices, and in particular to an electric heater.

BACKGROUND

In order to improve an environment and reduce an environmental pollution caused by coal-fired heating, more and more cities vigorously promote the "coal-to-electricity" project and encourage an use of an electric heating technology for heating.

Electric heaters are generally based on natural convection heat transfer and radiant heat transfer. The natural convection heat transfer uses a difference in density of hot and cold air as power to drive indoor air to be circulated, and thereby an indoor temperature is adjusted. Heat of the radiant heat transfer is easily absorbed by a human body and clothes worn on the human body, an effect of human body heating is good, and it is highly efficient and energy-saving.

However, in a heating process of a traditional electric heater, since a natural convection air directly floats up, a convective heat is directly transferred to a top of a room, and a temperature of a lower personnel activity area is lower, thereby it leads to apparent temperature stratification in a vertical direction and low heat utilization efficiency. In addition, it makes people have a bad experience of "hot head and cold feet", feeling not comfortable.

SUMMARY

Based on this, some embodiments of the present disclosure provide an electric heater with high heat utilization efficiency in allusion to a problem of a traditional electric heater that the heat utilization efficiency is low.

The electric heater includes a housing, a heating member and a convection member.

The housing is provided with an air inlet and an air outlet, and the housing internally has an air duct communicated between the air inlet and the air outlet.

The heating member and the convection member are both assembled in the air duct, the heating member is configured for heating the air entering from the air inlet to the air duct during energization, the convection member is configured for blowing a heated air from the air duct to the air outlet for discharging.

Herein, the air outlet is provided on a bottom end of the housing close to a ground.

The above electric heater ensures that the wind blows into a room from a position close to the ground under an action of the convection member, and floats up under an action of buoyancy, thereby a temperature stratification in a vertical direction is reduced, and the utilization rate of heat is improved. It makes upper and lower parts of a human body feel the heat, and the user experience is improved.

In some embodiments, the housing includes a bottom surface, a top surface, and a side surface connected between the top surface and the bottom surface, and the bottom surface and an end of the side surface connected with the bottom surface serve as the bottom end of the housing.

In some embodiments, the air outlet is provided at the end, connected with the bottom surface, of the side surface of the housing, and the air inlet is provided at an end, connected with the top surface, of the side surface of the housing and the top surface of the housing.

In some embodiments, the air outlet is provided at one end, connected with the bottom surface, of the side surface of the housing, and the air inlet is provided at one end, connected with the top surface, of the side surface of the housing or the top surface of the housing.

In some embodiments, the heating member includes an electric heating film heating member, herein the air inlet is at least partially used as a heat radiating port.

In some embodiments, the heating member is directly faced to the heat radiating port.

In some embodiments, the housing includes a body and a radiation grid, wherein the radiation grid is assembled on the body, and the heat radiating port is formed on the radiation grid.

In some embodiments, the housing includes a body and an air outlet grid, wherein the air outlet grid is assembled on the body, and the air outlet is formed on the air outlet grid.

In some embodiments, in a direction of gravity, the convection member is disposed lower than a position of the heating member.

In some embodiments, the air duct includes an air inlet duct and an air outlet duct which are communicated up and down, and the air inlet duct is communicated with the air inlet, and the air outlet duct is communicated with the air outlet.

Herein the heating member is disposed in the air inlet duct, and the convection member is disposed in the air outlet duct.

In some embodiments, there is a distance between a top end of the heating member and a top wall of the housing.

The electric heater further includes an air deflector disposed in the air inlet duct, two ends of the air deflector are respectively connected with a bottom end of the heating member and an inner wall of the housing, and the heating member and the air deflector divide the air inlet duct to form a first sub-air inlet duct and a second sub-air inlet duct which are communicated to each other.

Herein, the first sub-air inlet duct is communicated with the air inlet, and the second sub-air inlet duct is communicated between the first sub-air inlet duct and the air outlet duct.

In some embodiments, the electric heater further includes a volute casing and a volute tongue disposed in the air outlet duct, and the volute tongue is stretched into the volute casing, and the volute tongue, the volute casing and the inner wall of the housing forms an air outlet space, the air inlet duct and the air outlet are communicated by the air outlet space.

Herein, the convection member is disposed in the air outlet space.

In some embodiments, the convection member is a cross-flow fan, and the cross-flow fan is disposed in the air duct along a horizontal direction.

DETAILED DESCRIPTION OF THE EMBODIMENTS

Figure 1:
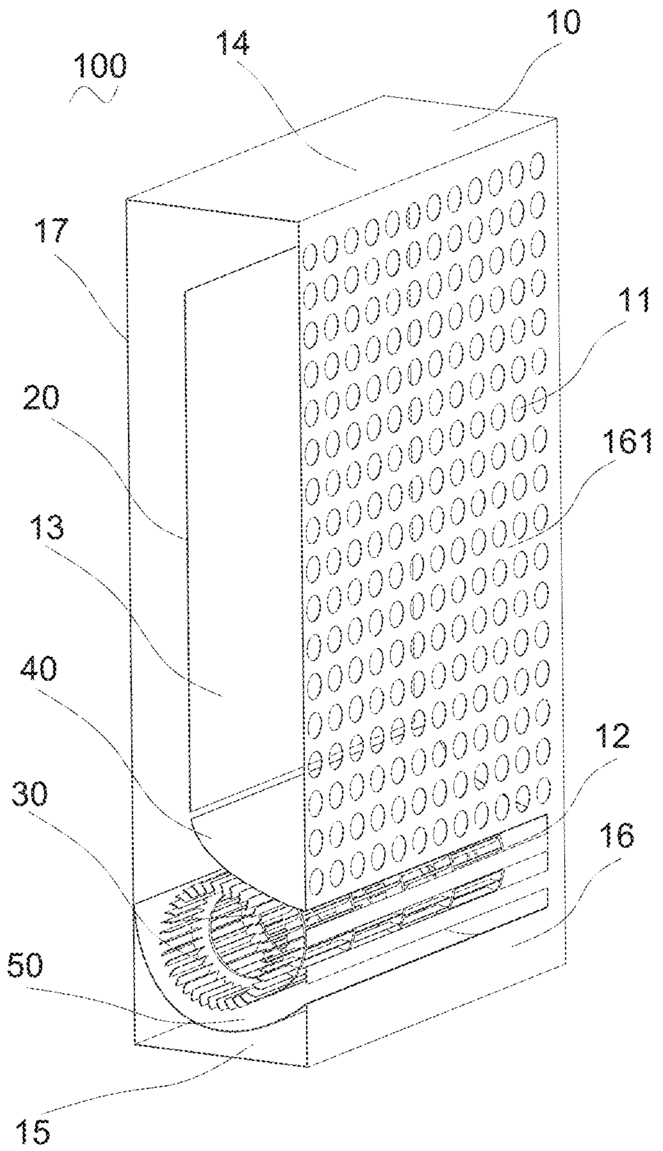
FIG. 1 illustrates a perspective view of an electric heater provided by an embodiment of the present disclosure.

In order to conveniently understand the present disclosure, the present disclosure is more comprehensively described below with reference to relevant drawings. The some embodiments of the present disclosure are shown in the drawings. However, the present disclosure is implemented in many different forms, and is not limited to the embodiments described herein. On the contrary, a purpose of providing these embodiments is to make the understanding of the content disclosed in the present disclosure more thorough and comprehensive.

It should be noted that while an member is referred to as being “fixed to” another member, it is directly on another member or an intermediate member is also be existent. While an member is considered to be “connected” to another member, it is directly connected to another member or an intermediate member is existent at the same time. The terms “vertical”, “horizontal”, “left”, “right” and similar expressions used herein are for illustrative purposes only.

Unless otherwise defined, all technical and scientific terms used herein have the same meaning as commonly understood by those skilled in the art to which the present disclosure belongs. Terminologies used in the description of the present disclosure herein are only for the purpose of describing the specific embodiments, and are not intended to limit the present disclosure. The term “and/or” as used herein includes arbitrary and all combinations of one or more related listed items.

Refer to FIG. 1, some embodiments of the present disclosure provide an electric heater 100 for heating air while energized, and the heated air flows into a room by a convection manner, as to provide a user with heating need. In some embodiments, the electric heater 100 includes a housing 10 and a heating member 20. The heating member 20 is disposed in the housing 10 to heat the air while energized. The heated air flows into the room by the convection mode, as to meet the heating need of the user.

The housing 10 is provided with an air inlet 11 and an air outlet 12, and the housing 10 internally has an air duct 13 communicated between the air inlet 11 and the air outlet 12, and the heating member 20 is disposed in the air duct 13, so that the heating member 20 is communicated with the outside through the air inlet 11 and the air outlet 12, and the outside air enters the air duct 13 through the air inlet 11 and exchanges heat with the heating member 20 and then flows out from the air outlet 12.

In some embodiments, the electric heater 100 further includes a convection member 30, the convection member 30 is disposed in the air duct 13, and the convection member 30 blows the heated air in the air duct 13 to the air outlet 12 for discharging. The air outlet 12 is provided at the bottom end of the housing 10 close to the ground.

Through the above arrangement, under the action of the convection member 30, it is ensured that the wind blows into the room at a position close to the ground, and then the hot air floats up under the action of buoyancy, thereby the temperature stratification in a vertical direction is reduced, and the utilization rate of heat is improved. In addition, it makes the upper and lower parts of a human body feel the heat, and the user experience is improved.

In some embodiments, the housing 10 includes a bottom surface, a top surface, and a side surface connected between the top surface and the bottom surface, and the bottom surface and one end of the side surface connected with the bottom surface serve as a bottom end of the housing 10. Understandably, in other embodiments, the housing 10 does not have a bottom surface. In this case, one end, away from the top surface, of the side surface serves as the bottom end of the housing 10, and it is not limited herein.

In some embodiments, the housing 10 is a hollow rectangular parallelepiped structure. Understandably, in other embodiments, the shape of the housing 10 is not limited.

Continue to refer to FIG. 1, in some embodiments, the height of the housing 10 in the vertical direction is greater than its length and width, namely the electric heater 100 is a vertical-type electric heater 100. The housing 10 includes a top plate 14 (the top surface of the housing 10 is formed on the top plate 14), a bottom plate 15 (the bottom surface of the housing 10 is formed on the bottom plate 15), a first side plate 16, a second side plate, a third side plate 17 and a fourth side plate (the side surfaces are formed on the first side plate 16, the second side plate, the third side plate 17 and the fourth side plate), the first side plate 16, the second side plate, the third side plate 17 and the fourth side plate are successively connected end to end and all assembled on the bottom plate 15, and the top plate 14 is covered on the first side plate 16, the second side plate, the third side plate 17 and the fourth side plate. The six parts of the top plate 14, the bottom plate 15, the first side plate 16, the second site plate, the third side plate 17 and the fourth side plate are jointly surrounded to form the above hollow rectangular parallelepiped structure.

Because one side surface of the housing 10 faces the human body in a normal using state, this side is defined as the front side, one side opposite to this side is the rear side, and the other two sides are the left and right sides. It is described below in details by taking the first side plate 16 facing the human body as an example. At this time, the first side plate 16 is the front side panel, the third side plate 17 is the rear side plate, and the second side plate and the fourth side plate are respectively the left side plate and the right side plate.

In some embodiments, in the direction of gravity, the air inlet 11 is disposed above the air outlet 12. Understandably, in other embodiments, the positions of the air inlet 11 and the air outlet 12 are not limited.

Figure 2:
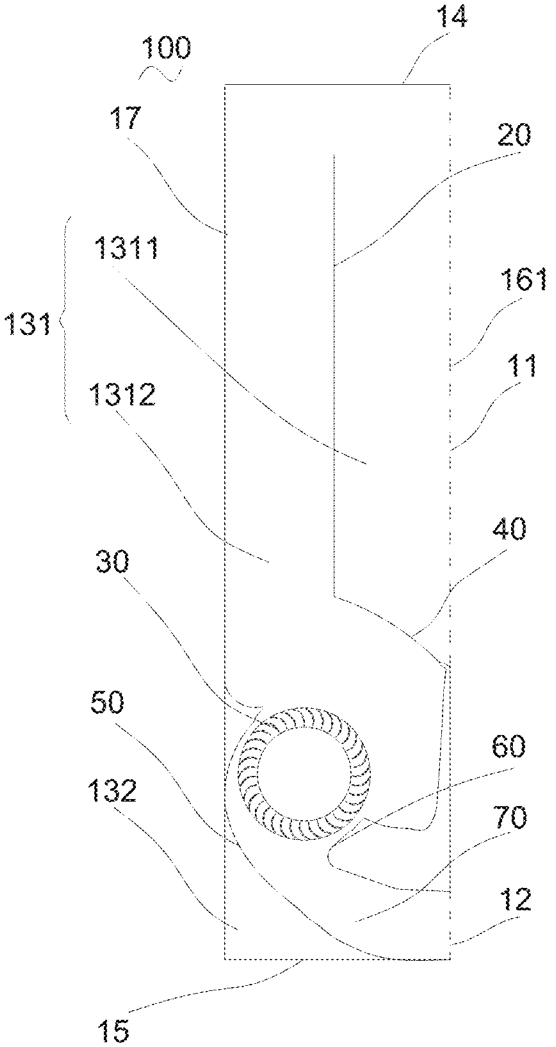
FIG. 2 illustrates a side view of the electric heater shown in FIG. 1.
Figure 3:
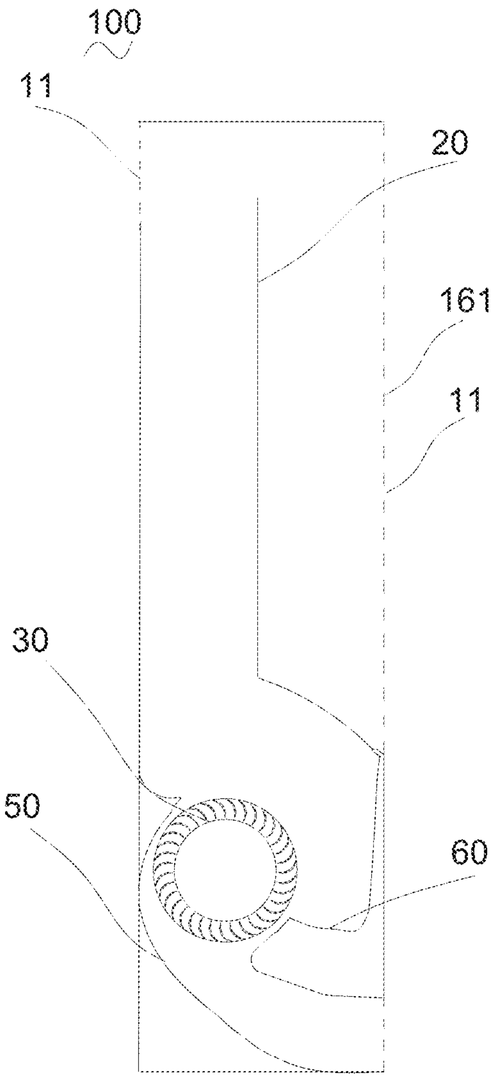
FIG. 3 illustrates a side view of an electric heater provided by another embodiment of the present disclosure.
Figure 4:
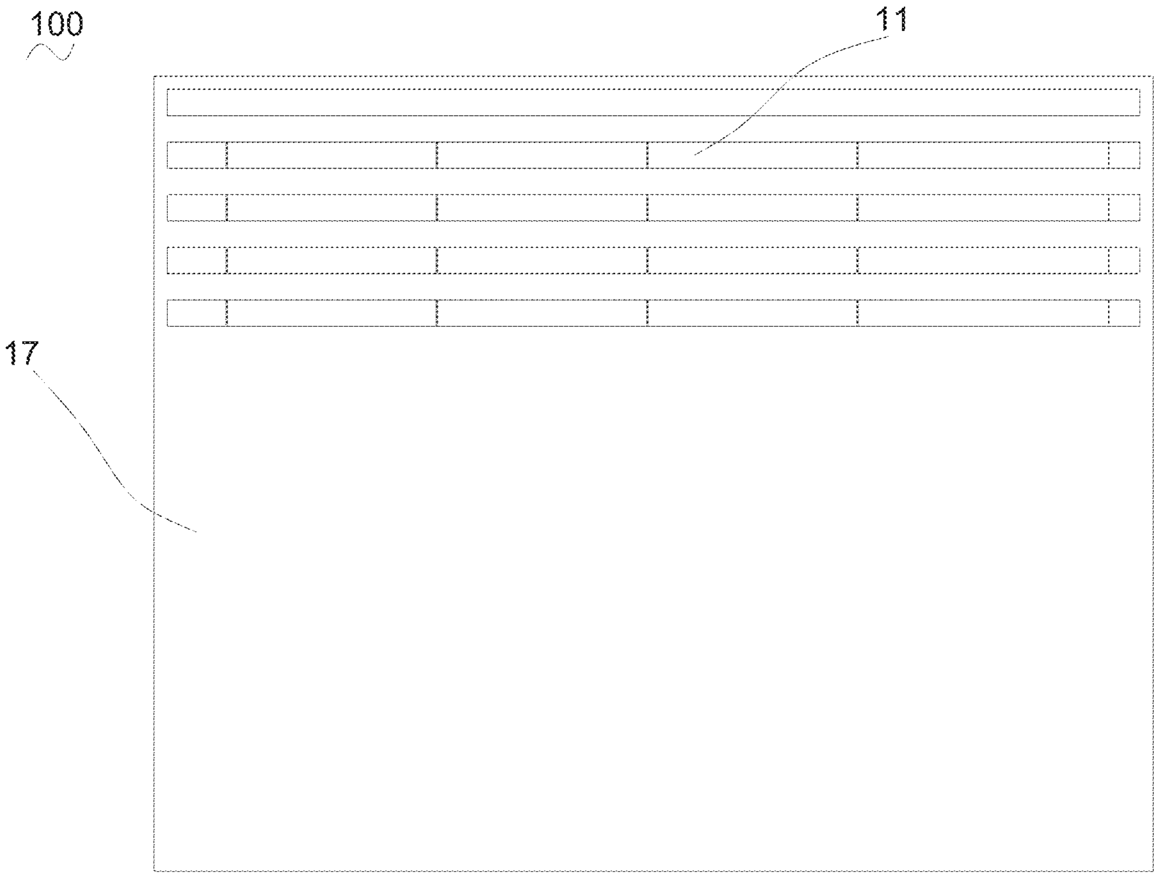
FIG. 4 illustrates a rear view of the electric heater shown in FIG. 3.
Figure 5:
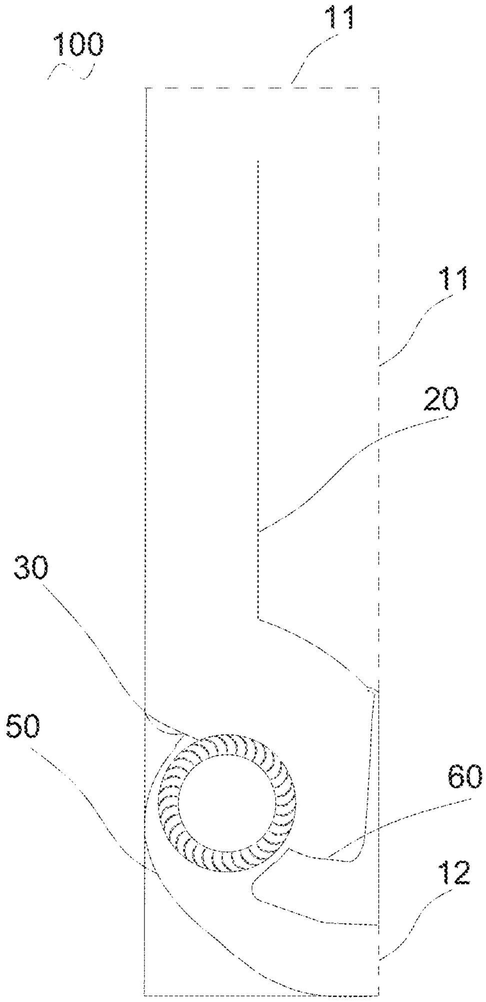
FIG. 5 illustrates a side view of an electric heater provided by another embodiment of the present disclosure.
Figure 6:
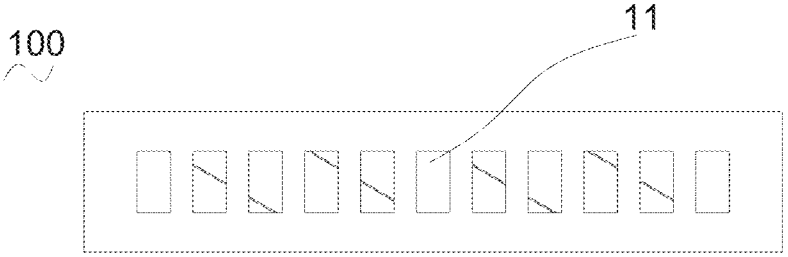
FIG. 6 illustrates a top view of the electric heater shown in FIG. 5.

Refer to FIG. 2, in a specific embodiment, the air inlet 11 and the air outlet 12 are both provided on the front side plate, and the air outlet 12 is located below the air inlet 11, namely the air inlet 11 is provided on one end, connected with the top plate 14, of the front side plate, and the air outlet 12 is provided on one end, connected with the bottom plate 15, of the front side plate. Understandably, in another embodiment, the air outlet 12 is provided on the front side plate, and the air inlet 11 is provided on the front side plate and the rear side plate at the same time (refer to FIG. 3 and FIG. 4). In another embodiment, the air outlet 12 is provided on the front side plate, and the air inlet 11 is provided on the front side plate and the top plate 14 at the same time (refer to FIG. 5 and FIG. 6). In other embodiments, the air outlet 12 is provided on the front side panel, and the air inlet 11 is provided on the front side plate, the rear side plate and the top plate 14 at the same time, it is not limited here.

In some embodiments, the air outlet 12 is provided on the bottom plate 15, and an arrangement position of the air inlet 11 refers to a setting mode of the above embodiment.

In some embodiments, the heating member 20 is an electric heating film heating member 20, and at this time, the air inlet 11 is at least partially used as a heat radiating port. Namely the electric heating film heating member 20 use both radiation heat transfer and convection heat transfer. It radiates heat to the outside through a part of the air inlet 11 (the part of the air inlet 11 either supplies the air or radiate the heat to the outside). The emissivity of the electric heating film heating member 20 is as high as 0.9, and it directly transfers the radiant heat to the human body and quickly increase the temperature of the human body.

It is understandable that in other embodiments, the heating member 20 is of other types, as long as it achieves a function of heating cold air, it is not limited herein.

In some embodiments, an internal film of the electric heating film heating member 20 is in various forms such as a single film, a plurality of films or staggered arrangement of the plurality of the films, it is not limited herein.

Continue to refer to FIG. 1 and FIG. 2, the front side plate (first side plate 16) includes a radiation grid 161 and an air outlet grid (unshown). At this time, the top plate 14, the bottom plate 15, a part of the first side plate 16, the second side plate, the third side plate 17 and the fourth side plate form a body of the housing 10. The radiation grid 161 and the air outlet grid are all assembled on the body of the housing 10, the above heat radiating port is formed on the radiation grid 161, the air outlet 12 is formed on the air outlet grid, and both the radiant heat and convective heat are transmitted to the room from the front side plate. In some embodiments, the radiation grid 161 and the air outlet grid have openings in the form of a circle, a square, a diamond or a racetrack-type.

Understandably, in other embodiments, the above radiation grid 161 is arranged on the top plate 14 or the rear side plate, it is not limited herein.

The heating member 20 is vertically disposed, and the projection of the heating member 20 on a plane in which the radiation grid 161 is located at least partially covers the heat radiating port, as to ensure that the radiant heat generated by the heating member 20 is directly radiated from the heat radiating port.

Continue to refer to FIG. 2, in some embodiments, the air duct 13 includes an air inlet duct 131 and an air outlet duct 132 that are sequentially communicated up and down. The air inlet duct 131 is communicated with the air inlet 11, and the air outlet duct 132 is communicated with the air outlet 12, the heating member 20 is disposed in the air inlet duct 131, and the convection member 30 is disposed in the air outlet duct 132. Through the above arrangement, the convection member 30 conveniently blows the hot air flowed from the inlet air duct 1311 to the outlet air duct 1322 to the air outlet 12 for discharging.

In some embodiments, the heating member 20 is vertically disposed in the air inlet duct 131, and there is a distance between a top end of the heating member 20 and an inner wall of the housing 10, and the electric heater 100 further includes an air deflector 40 disposed in the air inlet duct 1311, two ends of the air deflector 40 are respectively connected with a bottom end of the heating member 20 and the inner wall of the housing 10. The heating member 20 and the air deflector 40 divide the air inlet duct 1311 to form a first sub-air inlet duct 1311 and a second sub-air inlet duct 1312 which are communicated to each other, the first sub-air inlet duct 1311 is communicated with the air inlet 11, and the second sub-air inlet duct 1312 is communicated between the first sub-air inlet duct 1311 and the air outlet duct 1322.

Through the above arrangement, the cold air entering from the air inlet 11 firstly enters the first sub-air inlet duct 1311 and exchanges heat with the heating member 20, and then enters the second sub-air inlet duct 1312 to exchange the heat with the heating member 20 again, and enters the air outlet duct 1322 from the second sub-air inlet duct 1312 under the action of the convection member 30 and then flows to the air outlet 12 for discharging. In this way, the number of heat exchanges between the cold air and the heating member 20 is increased, it is ensured that the air flowed out from the air outlet 12 has the higher heat.

Understandably, in some embodiments, while the air inlet 11 is provided on the rear side plate or the top plate 14, the second sub-air inlet duct 1312 is directly communicated with the air inlet 11.

Continue to refer to FIG. 2, in some embodiments, the electric heater 100 further includes a volute casing 50 and a volute tongue 60. Both the volute casing 50 and the volute tongue 60 are disposed in the air outlet duct 1322, and the volute tongue 60 is stretched into the volute casing 50, the volute tongue 60, the volute casing 50 and the inner wall of the housing 10 form an air outlet space 70, the second sub-air inlet duct 1312 and the air outlet 12 is communicated by the air outlet space 70, and the convection member 30 is disposed in the air outlet space 70.

Through arranging the convection member 30 in the air outlet space 70 formed by the above volute casing 50 and volute tongue 60, the pressure of an air flow output by the convection member 30 is relatively high, the air flow is conveniently discharged from the air outlet 12.

In some embodiments, the volute casing 50 is fixedly connected with the rear side plate and the bottom plate 15 of the housing 10, and the volute tongue 60 is fixedly connected with the front side plate.

In one embodiment, the above convection member 30 is a cross-flow fan. The cross-flow fan includes a motor and a cross-flow blade. The cross-flow blade is connected with the motor. The motor drives the cross-flow blade to rotate so that the wind located in the air outlet space 70 is flowed to the air outlet 12 for discharging. Understandably, in other embodiments, the convection member 30 is other types of fans, it is not limited herein.

In some embodiments, the cross-flow fan blade is disposed in the air outlet space 70 along a length direction of the housing 10, so that while the cross-flow blade is rotated, the wind is conveniently flowed to the air outlet 12 for discharging, and the motor is fixedly connected with the left side plate or the right side plate of the housing 10.

A working principle of the electric heater 100 provided in the embodiments of the present disclosure is as follows.

The electric heater 100 is started, the heating member 20 is energized and radiates heat outward through the heat radiating port, the motor drives the cross-flow blade to rotate, and the air flow, under the action of the cross-flow blade, is successively flowed from the air inlet 11 to the first sub-air inlet duct 1311, the second air inlet duct 1312, the air outlet space 70 and the air outlet 12 while the top plate 14 and the rear side plate, or the top plate 14, or the rear side plate is provided with the air inlet 11, a part of the air flow directly enters the air outlet space 70 through the second sub-air inlet duct 1312, the hot air flowing out of the air outlet 12 is transported to a human activity area parallel to the ground or at an angle to the ground, the temperature near the ground is improved, and carpet-type heating is achieved. In addition, because the heating member 20 radiates the heat outwards through the heat radiating port, the radiant heat is directly transmitted to the human body. Under the dual effects of convection and radiation, the temperature of a space in which the human body is located is rapidly improved, and the comfort of the human body is increased.

Technical features of the above embodiments may be combined arbitrarily. In order to make the description concise, all possible combinations of the various technical features in the above embodiments are not described. However, as long as there is no contradiction in the combinations of these technical features, all should be considered as a scope recorded in the description.

The above embodiments only express several implementation modes of the present disclosure, and the descriptions thereof are relatively specific and detailed, but it should not be understood as limiting the scope of the patent disclosure. It should be pointed out that for those of ordinary skill in the art, without departing from the concept of the present disclosure, a plurality of modifications and improvements may be made, and these all fall within a scope of protection of the present disclosure. Therefore, the scope of protection of the patent in the present disclosure shall be subject to the appended claims.

What is claimed is:

1. An electric heater, comprising:

a housing, the housing being provided with an air inlet and an air outlet, and the housing internally having an air duct communicated between the air inlet and the air outlet;

a heating member and a convection member, both being assembled in the air duct, the heating member being configured for heating the air entering from the air inlet to the air duct during energization, the convection member being configured for blowing a heated air from the air duct to the air outlet for discharging, wherein the air outlet is provided on a bottom end of the housing close to a ground;

wherein, in a direction of gravity, the convection member is disposed lower than a position of the heating member;

wherein the air duct comprises an air inlet duct and an air outlet duct which are communicated up and down, and the air inlet duct is communicated with the air inlet, and the air outlet duct is communicated with the air outlet, wherein the heating member is disposed in the air inlet duct, and the convection member is disposed in the air outlet duct;

wherein there is a distance between a top end of the heating member and a top wall of the housing;

the electric heater further comprises an air deflector disposed in the air inlet duct, two ends of the air deflector are respectively connected with a bottom end of the heating member and an inner wall of the housing, and the heating member and the air deflector divide the air inlet duct to form a first sub-air inlet duct and a second sub-air inlet duct which are communicated to each other, wherein, the sub-air inlet duct is communicated with the air inlet, and the second sub-air inlet duct is communicated between the first sub-air inlet duct and the air outlet duct.

2. The electric heater according to claim 1, wherein the housing comprises a bottom surface, a top surface, and a side surface connected between the top surface and the bottom surface, and the bottom surface and an end of the side surface connected with the bottom surface serve as the bottom end of the housing.

3. The electric heater according to claim 2, wherein the air outlet is provided at the end, connected with the bottom surface, of the side surface of the housing, and the air inlet is provided at an end, connected with the top surface, of the side surface of the housing and the top surface of the housing.

4. The electric heater according to claim 2, wherein the air outlet is provided at one end, connected with the bottom surface, of the side surface of the housing, and the air inlet is provided at one end, connected with the top surface, of the side surface of the housing or the top surface of the housing.

5. The electric heater according to claim 1, wherein the heating member comprises an electric heating film heating member; wherein the air inlet is at least partially used as a heat radiating port.

6. The electric heater according to claim 5, wherein the heating member is directly faced to the heat radiating port.

7. The electric heater according to claim 5, wherein the housing comprises a body and a radiation grid, wherein the radiation grid is assembled on the body, and the heat radiating port is formed on the radiation grid.

8. The electric heater according to claim 1, wherein the housing comprises a body and an air outlet grid, wherein the air outlet grid is assembled on the body, and the air outlet is formed on the air outlet grid.

9. The electric heater according to claim 1, wherein the electric heater further comprises a volute casing and a volute tongue disposed in the air outlet duct, and the volute tongue is stretched into the volute casing, the volute tongue, the volute casing and the inner wall of the housing form an air outlet space, the air inlet duct and the air outlet are communicated by the air outlet space, wherein the convection member is disposed in the air outlet space.

10. The electric heater according to claim 1, wherein the convection member is a cross-flow fan, and the cross-flow fan is disposed in the air duct along a horizontal direction.

* * * * *